(12) United States Patent
Ohbuchi et al.

(10) Patent No.: US 9,172,863 B2
(45) Date of Patent: Oct. 27, 2015

(54) VIDEO SIGNAL PROCESSING APPARATUS

(71) Applicant: Hitachi, Ltd., Tokyo (JP)

(72) Inventors: Mari Ohbuchi, Yokohama (JP); Junji Shiokawa, Chigasaki (JP)

(73) Assignee: Hitachi Industry & Control Solutions, Ltd., Hitachi-shi (JP)

( * ) Notice: Subject to any disclaimer, the term of this patent is extended or adjusted under 35 U.S.C. 154(b) by 121 days.

(21) Appl. No.: 13/732,924

(22) Filed: Jan. 2, 2013

(65) Prior Publication Data

US 2014/0016020 A1    Jan. 16, 2014

(30) Foreign Application Priority Data

Jan. 6, 2012    (JP) ................. 2012-000885

(51) Int. Cl.
*H04N 5/232*    (2006.01)
*G03B 13/00*    (2006.01)

(52) U.S. Cl.
CPC ................ *H04N 5/23212* (2013.01)

(58) Field of Classification Search
CPC .................................. H04N 5/23212
USPC ................. 348/353–356, 349, 345
See application file for complete search history.

(56) References Cited

U.S. PATENT DOCUMENTS

2010/0060780 A1* 3/2010 Shibagami et al. ........... 348/345
2010/0123818 A1* 5/2010 Ono ............................... 348/345
2010/0315514 A1* 12/2010 Uchida ......................... 348/187

FOREIGN PATENT DOCUMENTS

JP    2007286474 A   * 11/2007
JP    2010243899 A   * 10/2010
JP    2010-286791       12/2010
JP    2011253099 A   * 12/2011

* cited by examiner

*Primary Examiner* — Sinh Tran
*Assistant Examiner* — Zhenzhen Wu
(74) *Attorney, Agent, or Firm* — Foley & Lardner LLP

(57) ABSTRACT

A video signal processing apparatus, comprises: an image pickup unit, having a focus lens; an evaluation value calculator unit, specifying a region, in which brightness higher than a predetermined value lies, from within a region to be a target, for which a focal point estimation value is calculated to be used for moving the focus lens to a focal point, and to calculate the focal point estimation value by excluding the region, in which the brightness higher than the predetermined value lies, from a focal point estimation value calculation target; and a system controller unit, to be focused upon basis of the focal point estimation value calculated by the evaluation value calculator unit, wherein the system controller unit controls the focus lens to move to a position, which is determined in advance.

9 Claims, 12 Drawing Sheets

VIDEO SIGNAL PROCESSING APPARATUS

This application relates to and claims priority from Japanese Patent Application No. 2012-000885 filed on Jan. 6, 2012, the entire disclosure of which is incorporated herein by reference.

BACKGROUND OF THE INVENTION

The present invention relates to a video signal processing apparatus.

As a background technology on the present technical field is already know the following Patent Document 1, for example. In that publication is described the following, i.e., "[Problem(s) to be Dissolved] It is determine a focusing position, correctly and easily, even if there is a point-like light source(s), thereby to achieve focusing. [Means for Dissolving] It comprises a focal point estimation calculating means, for setting up plural numbers of focal point estimation calculating areas, each differing in the size thereof from each other, for a video, and calculating a focal point estimation value of contrast for each of the focal point estimation calculating areas, while moving a focal lens 52 through a lens driver 55; an area selecting means for selecting a focus determining area for use of determining a focus position of the focus lens 52, from, the plural numbers of focal point estimation calculating areas, upon basis of presence/absence of the point-like light source(s) on the video; and a CPU 70 as a focusing controller means, for determining the focal position of the focus lens 52 upon basis the focus estimation value in the focus determining area, thereby moving the focus lens 52 to the focal point through the lens driver 55" (see the Abstract).

PRIOR ART DOCUMENTS

Patent Documents

[Patent Document 1] Japanese Patent Laying-Open No. 2010-286791 (2010).

BRIEF SUMMARY OF THE INVENTION

In the Patent Document 1, though mentioning therein a method for improving a AF operating capacity under the point-like light source; however, even if applying the present method therein, sometimes, the focal point estimation value is calculated with using a signal of the area where the point-like light source lies, and the AF control is executed with using that estimation value, on a scene having a large number of the point-like light sources or a scene where a subject of high brightness lies in almost of the part of video, and as a result thereof, there is a possibility of bringing the AF control to be unstable.

Then, an object, according to the present invention, accomplished is to provide a video signal processing apparatus, for suppressing the possibility of bringing the control to be instable, even for the subject having an extreme large number of areas of high brightness. In the AF control, in particular, in the AF control for dealing with a scene having the point-like light source(s) thereon.

Explaining an outline of representative one of the inventions, which are disclosed in the present application, for dissolving such problem mentioned above, is as follows:

(1) A video signal processing apparatus, comprising: an image pickup unit, having a focus lens; an evaluation value calculator unit, which is configured to specify a region, in which brightness higher than a predetermined value lies, from within a region to be a target, for which a focal point estimation value is calculated to be used for moving said focus lens to a focal point, and to calculate the focal point estimation value by excluding the region, in which said brightness higher than the predetermined value lies, from a focal point estimation value calculation target; and a system controller unit, which is configured to control to be focused upon basis of the focal point estimation value calculated by said evaluation value calculator unit, wherein said system controller unit controls said focus lens to move to a position, which is determined in advance, when a ratio of the region, in which said brightness higher than the predetermined value lies, to the region be the target, for which the focal point estimation value is calculated, is greater than a threshold value.

According to the present invention, it is possible to provide a video signal processing apparatus for enabling to suppress the instability of the AF control even on the scene having a large number of point-like light sources thereon.

BRIEF DESCRIPTION OF THE SEVERAL VIEWS OF THE DRAWING

Those and other objects, features and advantages of the present invention will become more readily apparent from the following detailed description when taken in conjunction with she accompanying drawings wherein.

DETAILED DESCRIPTION OF THE PREFERRED EMBODIMENTS

Hereinafter, embodiments according to the present invention will be fully explained by referring to the attached drawings.

(1) System Configuration

Herein, explanation will be given an example of the system configuration of a means for achieving an AF control, showing a high stability in a scene having a large number of pixels of high brightness, such as, that having a large number of point-like light sources, etc., by referring to a drawing.

Figure 1:
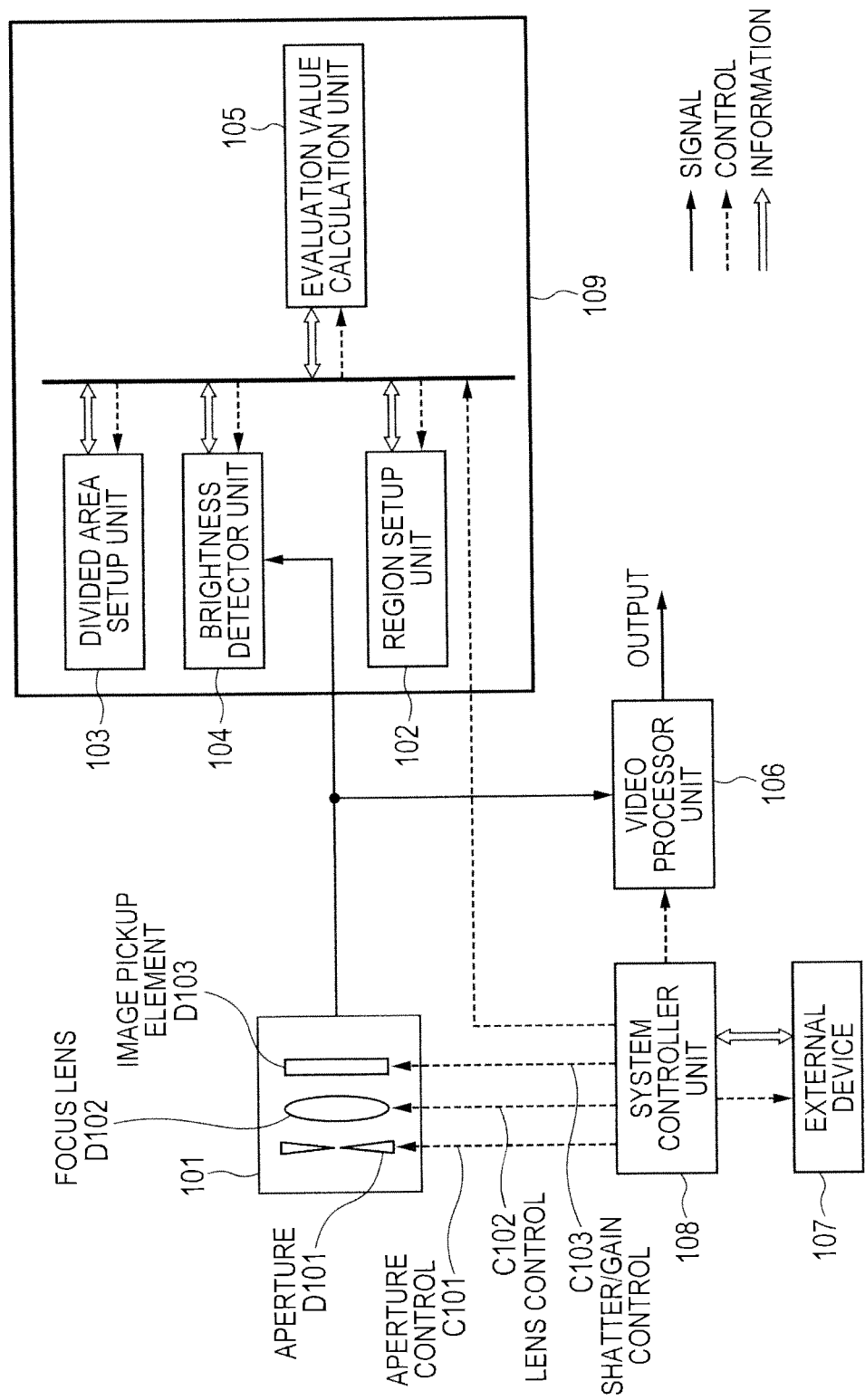
FIG. 1 is a view for explaining an example of the basic structure according to the present invention.

FIG. 1 is a view for explaining an example of the basic structure according to the present invention. An image pickup unit 101 is built up with applying an aperture D101 for adjusting an amount of rights entering from a subject, a focus lens D102 for adjusting a focal point of the lights passing through that aperture, and an image pickup element D103 for converting the lights passing through that focus lens into electricity, thereby outputting it as an output signal therefrom.

A region setup unit 102 determines or sets up an area or region to be a target for calculating a focal point estimation value, by an arbitrary size and at a position thereof, upon a command from a system controller unit 108. A divided region setup unit 103 determines or sets up an area(s) or region (s) by an arbitrary size(s) and an arbitrary number thereof in vertical/horizontal directions within the region, which is set up by the region setup unit 102, upon a command from the system controller unit 108. A brightness detector unit 104 detects presence/absence of a point-like light source (s) in each of the regions, which are set up by the divided region setup unit 103, upon a command from the system controller unit 108. An estimation calculator unit 105 calculates a focal point estimation value with using a video signal, of a region, being obtained by excluding the region, in which the point-like light source(s) lie (s), from a focal point estimation value calculation target region, with using information obtained from the brightness detector unit 104, upon a command from the system controller unit 108. The focal point estimation value is a signal, for example, being obtainable by integrating high-frequency components for each line of the video signal, for detecting a strength or intensity of an outline portion of the video signal of a region designated.

A video processor unit 106 executes a video signal process, such as, a noise removal, a gamma correction, an outline enhancement, a filter process, a zoom process, a camera shake compensation process, a vide recognition, etc., on the video signal, upon a command from the system controller unit 108, and also an output interface process thereon, for converting it into a signal format for an output equipment, such as, a TV or a storage, etc. The output interface process is that for converting into a video output, such as, NTSC or PAL, for example, and that for converting into a HDMI signal, for example, and for example, that for converting into a predetermined signal for network transmission. An external apparatus 107 is an external device (s), such as, an EEPROM (Electrically Erasable Programmable Read-Only Memory) to be used thereafter, for storing various kinds of setups therein, various kinds of sensors, such as, an angular velocity sensor, an acceleration sensor, etc, or a flash memory and so on. The system controller unit 108 controls the image pickup unit 101, the region setup unit 102, the divided region setup unit 103, the brightness detector unit 104, the estimation calculator unit 105, the video processor unit 106 and the external apparatus 107, appropriately.

An AF unit 109 indicates a block group necessary for an AF control. With such structures mentioned above, since the brightness detector unit 104 can specify a region, in which the point-like light source (s) lie (s), and with using a result of specifying, the estimation calculator unit 105 can calculate the focal point estimation value, through excluding the region, in which the point-like light source (s) lie (s), from the focal point estimation value calculation target region, it is possible to achieve AF with high accuracy even on a scene having the point-like light source (s) therein. Further, with moving/controlling of the focus lens to a predetermined position by the system controller unit 108, when a total area of the point-like light source areas, which are detected by the brightness detector unit 104, exceeds a predetermined area, it is possible to achieve the AF control, being stable even on a scene, having a large number of high-brightness pixels therein.

(2) Regarding Calculation of Focal Point Estimation Value

Figure 2:
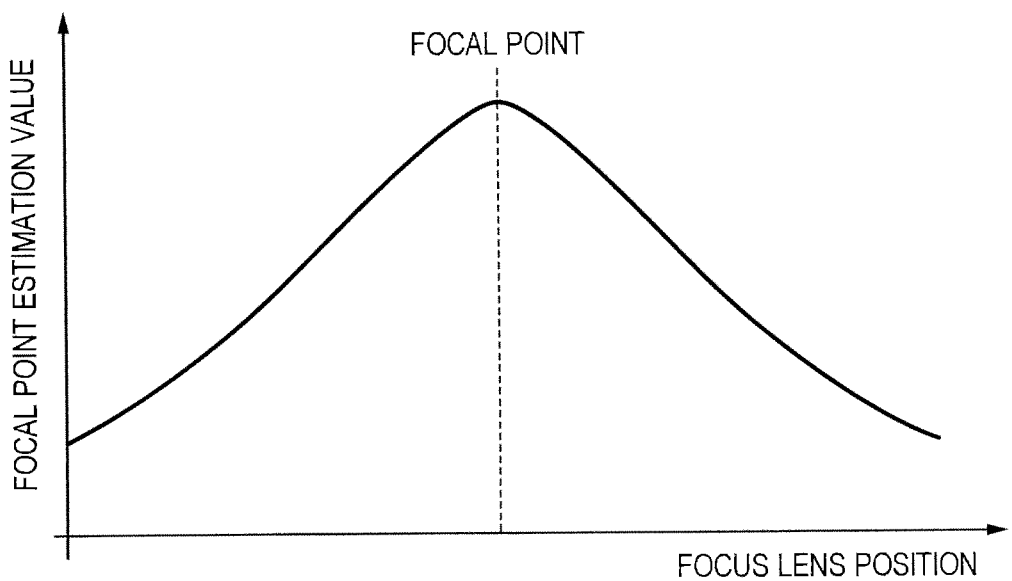
FIG. 2 is a view for explaining a focal point estimation value for determining strength/weakness of contrast on a general subject having no point-like light source thereon.

FIG. 2 is a view for explaining an example of the focal point evaluation value for determining the strength/weakness of contrast on a general subject, in which no point-like light source lies. The vertical axis presents a position of the focus lens, while the horizontal axis the focal point estimation value. Hereinafter, a position, at which the focus lens fits the focal point onto the subject, will be called "a focus fitting position". On the general subject, the nearer the focus lens comes close to the focal point, the stronger the outline thereof, and therefore a level of the focal point estimation value is increased, while it is decreased since the outline portion is weakened as it separates from. For this reason, with moving/controlling of the focus lens to a peak of the focal point estimation value, it is possible to fit the subject to the focal point, correctly.

Figure 3:
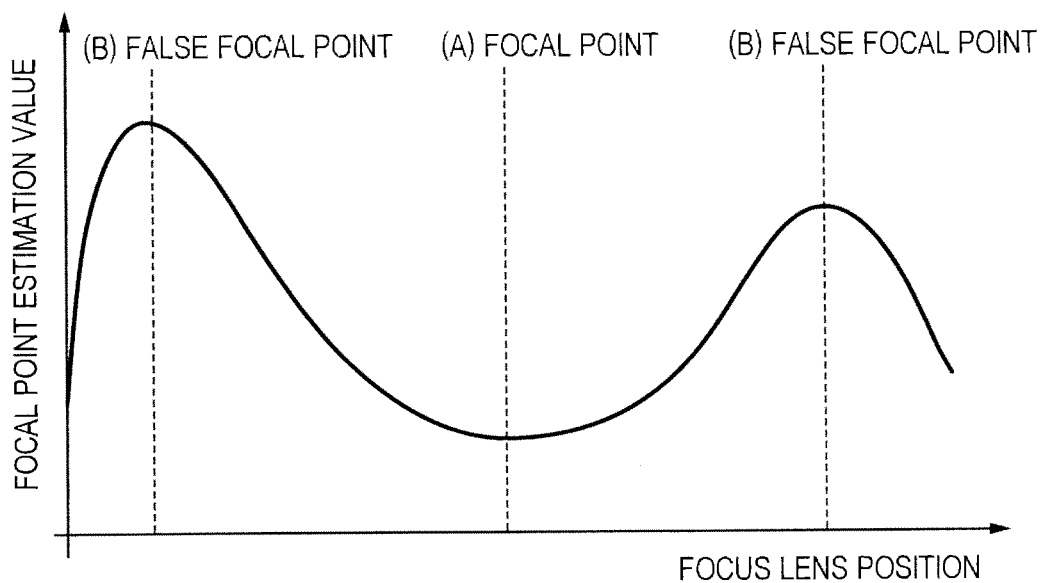
FIG. 3 is a view for explaining a focal point estimation value on a subject having a point-like light source(s) thereon.

FIG. 3 is a view for explaining an example of the focal point estimation value on the subject, on which the point-like light source(s) lie (s). Although a proper focal point is the focus lens position shown by (B) in the figure; however, in FIG. 3, the focal point estimation value at a point (A) does not reach to the peak. This is because the point-like light source looks blurred to be larger as is far from the focal point, then the outline portion comes to stronger as is far from the focal point, and as a result thereof, the focal point estimation value comes to a value larger than that at the focal point. For this reason, if conducting the conventional AF control, i.e., moving the focus lens to the position where the focal point estimation value Is the maximum, for the subject, on which the point-like light source (s) lie (s), then the focus lens is stopped focusing at a false focal point of (B). This false focal point means, according to the present embodiment, a focus lens position where the focus lens is stopped by the AF control in spite that it is not the proper focal point. Stopping of the focus lens at the false focal point generates so-called an out of focus.

Figure 4:
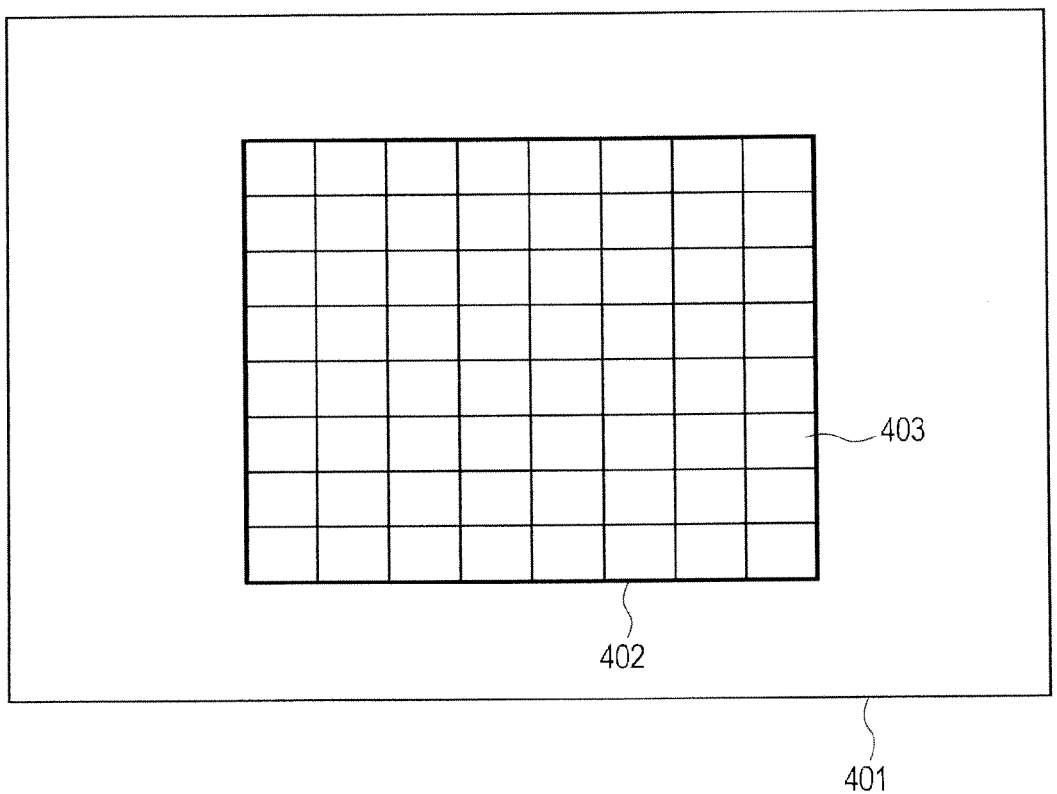
FIG. 4 is a view for explaining a region, which is set within a screen.

FIG. 4 is a view for explaining an example of the focal point estimation value calculation target region and the divided regions, which are set up within a screen. A frame on an outermost side shown by 401 is an outer frame of the screen. A frame shown by 402 is the focal point estimation value calculation target region, and it is preferable to determine this region to be smaller than the screen, for the purpose of preventing from so-called a rear focus, i.e., focusing on, not the subject to be focused, but a background thereof; however, it does not matter to determine it to be equal to or larger than the size of the outer frame of the screen. A reference numeral 403 depicts one of the regions, which are set up by the divided region setup unit 103 within a frame shown by 402. In the present embodiment, explanation will be given on an example where the frame 402 is divided into eight (8) portions, vertically and horizontally. However, the number of division should not be restricted only to this, i.e., various changes can be made, and for example, if determining the number of division to be same to that of the pixels within frame 402, it is possible to achieve detection of the point-like light source by a unit of pixel. However, in case of achieving the divided region setup unit 103 by hardware, although a hardware cost is increased if the number of division is too large, but it does not matter to increase the number of division for the purpose of improving the performance or capacity thereof, or to decrease the number of division for reducing a processing cost thereof.

(3) Brightness Supporting AF Control on Scene Having a Large Number of Point-Like Light Sources Explanation will be given on a brightness supporting AF control (the AF control enabled to deal with brightness) on a scene having a large number of the point-like light sources therein, by referring to FIGS. 5 and 6.

Figure 5:
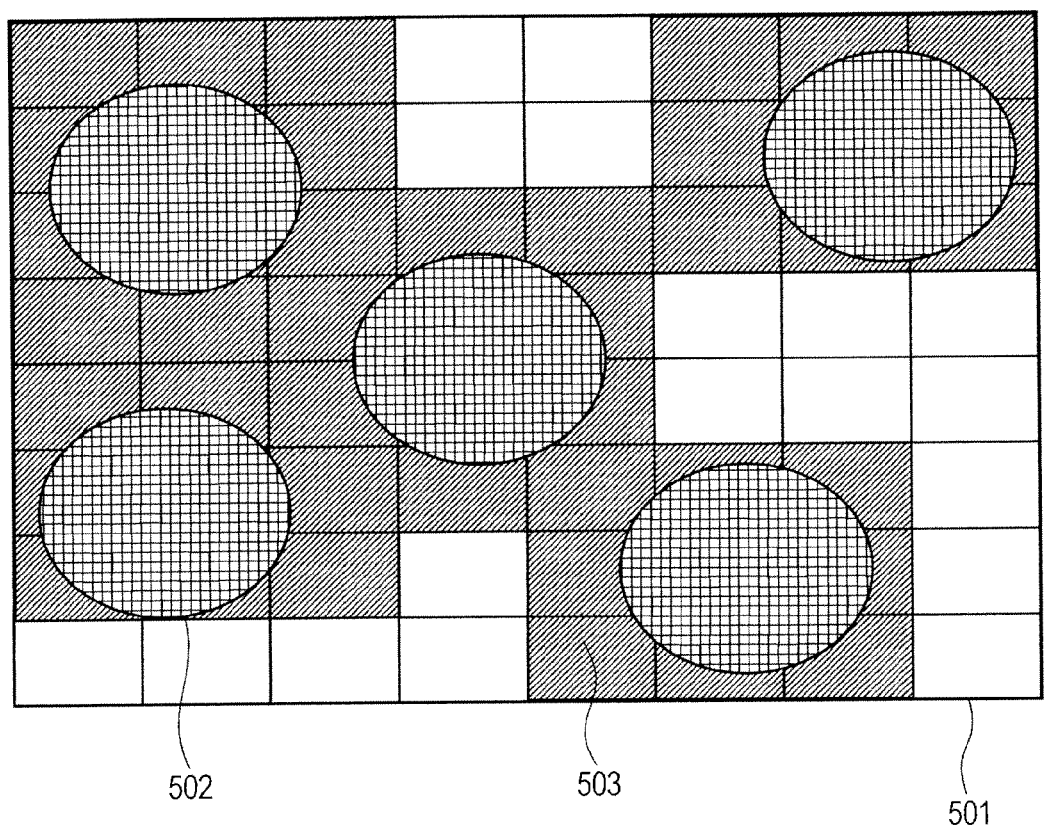
FIG. 5 is a view for explaining an example of an AF control for dealing with brightness on a scene having a large number of point-like light sources.

FIG. 5 is a view for explaining an example of the brightness supporting AF control on the scene having a large number of the point-like light sources therein. A frame shown by 501 is, similar to the frame 402, the focal point estimation value calculation target region set up within the screen. A reference numeral 502 depicts the point-like light source within the frame 501. Under this condition, among those regions divided by the divided region setup unit 103, the regions set up to have the point-like light source therein by the brightness detector unit 104 are as that shown by shading 503 in the figure, for example.

Figure 6:
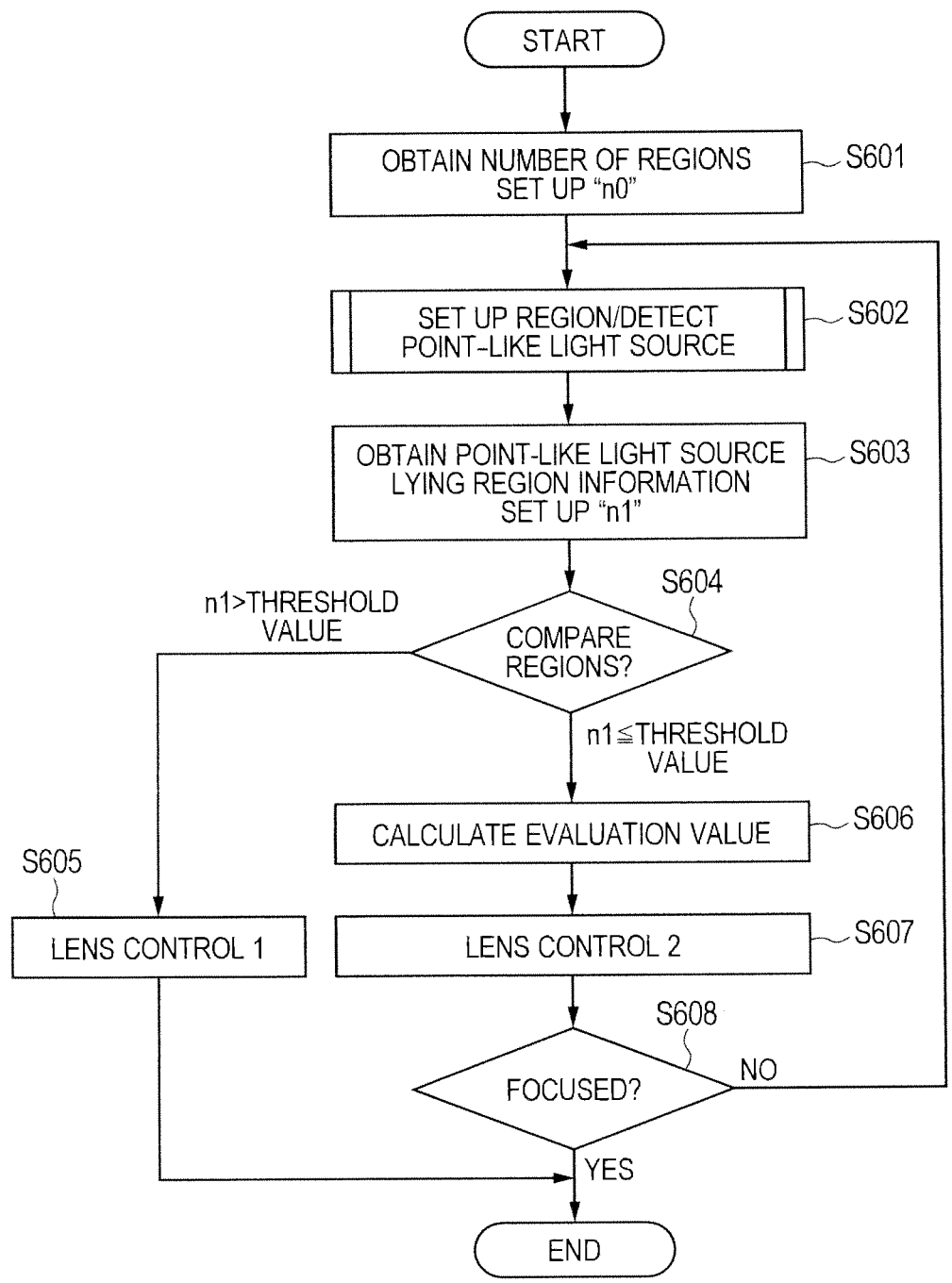
FIG. 6 is a view for showing an example of a flow of processes of the AF control for dealing with brightness on a scene having a large number of point-like light sources.

FIG. 6 is a view for showing an example of a flow of processes of the brightness supporting AF control on a scene having a large number of point-like light sources. The processes shown in FIG. 6 are executed by the system controller unit 108. According to the present method, an arbitrary number of regions are set up by the divided region setup unit 103, within the focal point estimation value calculation target region set up by the region setup unit 102, wherein the brightness detector unit 104 determines presence/absence of the point-like light source (s) within each region, and if the area of region (s), which is/are set up to have the point-like light source (s) therein, is larger than a threshold value, which is determined in advance, the position of the focus lens is moved/controlled to a predetermined position. When the AF control starts. In a step S601, the system controller unit 108 obtains a number of the divided regions to be set up within the focal point estimation value calculation target region. In this instance, the number of regions may be stored in the EEPROM (the external device 107), etc., as values in the vertical direction and the horizontal direction, respectively, to be used thereafter, or may be used a constant number. Or, a total number of divided regions to be set within the screen may be stored as "n0". In a step S602, the system controller unit 108 gives such commands, that the region setup unit 102 and the divided region setup unit 103 set up a region within the screen, as is shown in FIG. 4, for example, and that the brightness detector unit 104 detects presence/absence of the point-like light source (s) for each divided region. The details of the step S602 will be mentioned later. In a step S603, the system controller unit 108 obtains information relating to the region (s), in which the point-like light source (s) lie(s), from the brightness detector unit 104. In this instance, the number of regions, in which the point-like light source(s) lie(s), is stored as "n1".

In a step S604, the obtained number "n1" of regions, in which the point-like light source(s) lie(s), is compared with the threshold value, and when "n1" is larger than that, upon assuming that there are many regions to be excluded from the focal point estimation value calculation target region so that a sufficient focal point evaluation cannot be obtained for the AF control, the process shifts into a step S605. In this instance, the threshold value may be stored, in the EEPROM to be used thereafter. Also, it does not matter that, not the number "n1" of regions, but a number of high-brightness pixels, which can be calculated with using "n1", is compared with the threshold value. In the step S605, the focus lens is controlled to move to a predetermined position (d0), and the process is completed. In this instance, as the predetermined position may be used a value, which is set up in advance within the EEPROM, etc. For example, In case when using a present video signal processing apparatus under such an environment that the subject rarely lies in very close range (at very short distance), it is preferable to make the value of "d0" adjustable depending on the environment, such, as, the focus lens position, with which the focusing can be obtained at a position separating by several meters from the apparatus, is set up as "d0", etc.

In case where "n1" is set up to be less than the threshold value in the step S604, upon assuming that the sufficient focal point evaluation can be obtained for the AF control even if excluding the high-brightness region (s) from the focal point estimation value calculation target region, the process shifts into a step S606. In the step S606, the system controller unit 108 sets point-like light source existing region information, which is obtained In the step S603 into the estimation calculator unit 105, and gives a command to calculate the focal point evaluation value by excluding the region(s), in which the point-like light source(s) lie(s), from the focal point estimation value calculation target region. In a step S607, the focus lens is controlled by a certain amount with using the focal point evaluation value, which is calculated in the step S606. In a step S608, determination is made on whether the focus lens is at the focal point or not, and if it is at the focal point, the process is completed. If it is not at the focal point, the process turns back to the step S602, and a series of processes will be conducted. However, if controlling the process to shift, not into the step S602, but into the step S603, when deciding the focus lens is not at the focal point, in the determination made in the step S608, since the number of regions, as the target for calculating the focal point estimation value, is a constant, it is possible to obtain such focal point estimation value, being stable and high in accuracy, as was shown in FIG. 2, previously, after when the control is started on the focus lens once, until when the focus lens is stopped at the focal point. Whether the process should shift onto the step S602 by taking serious consideration onto characteristics of following the scene, or into the step S603 by taking serious consideration onto stability of the focal point estimation value, may be determined depending on the environment where the present video signal processing apparatus is used.

In the present embodiment, when the regions to be the target of exclusion increases, so that it is impossible to obtain the focal point estimation value sufficient for the AF control, within the brightness supporting AF control, i.e., excluding the region(s), in which the point-like light source(s) lie(s), from the focal point estimation value calculation target region, it is possible to prevent the AF control from becoming unstable, by controlling the focus lens to the predetermined position. With such processes as mentioned above, it is possible to achieve the brightness supporting AF control, being stable on the scene having a large number of point-like light sources therein.

However, in the present embodiment there is shown the example, wherein the process shifts into the step S605, directly, when "n1" of fine regions, in which the point-like light sources lie, is larger than the threshold value; however, it does not matter that the process turns back to the step S602 at this stage, so that, after conducting a process for reducing a ratio of the regions, in which the point-like light sources lie, with respect to the focal point estimation value calculation target region, by enlarging the setup of regions or increasing the division number, it shifts into the step S605, in case where "n1" does not come down to be less than the threshold value. Also, the threshold value to be applied herein should not be limited to the number of regions, which is set up in advance, but as the threshold value may be applies a ratio of allowable regions, in which the point-like light sources lie, with respect to the focal point estimation value calculation target region, or a total area of the allowable regions, in which the point-like light sources lie; i.e., various setups can be made.

Figure 7:
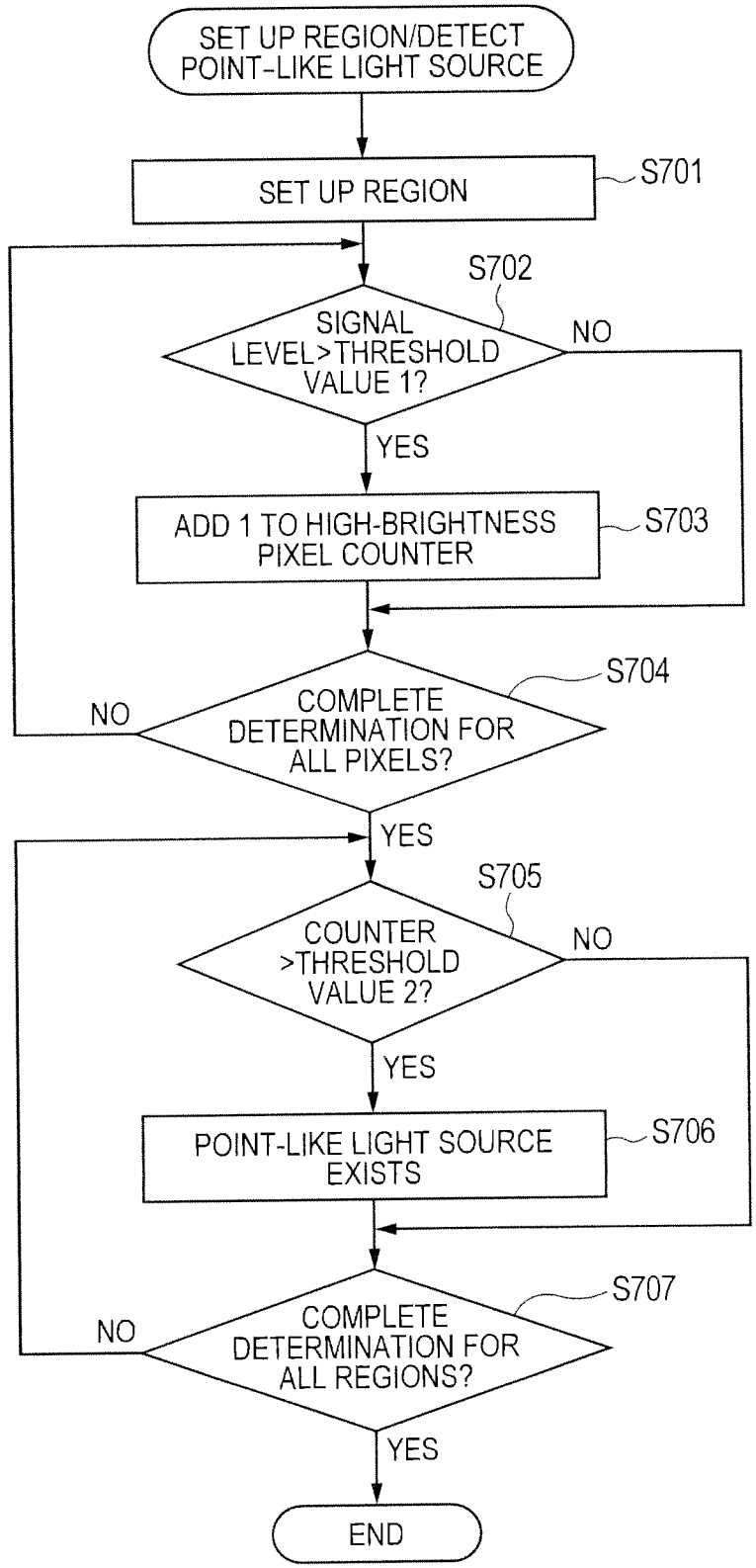
FIG. 7 is a view for showing an example of detailed flow of a process, for region setup/point-like light source detection in a step S602 (FIG. 6)

FIG. 7 is a view for showing an example of detailed flow of a process, for region setup/point-like light source detection in a step S602. In a step S701, the region setup unit 102 sets up region (s) within the screen, as shown in FIG. 4, for example, with using the information, which is set up by the system controller unit 108. In a step S702, the brightness detector unit 104 compare a signal level to a threshold value 1 for each pixel, and determines that the pixel is a part of the point-like light source if it is larger than the threshold value 1, in the value thereof, and in a step S703, a high-brightness pixel counter is incremented by one (1). In this instance, the high-brightness pixel counter is prepared for each of the regions set up in the step S701, and the high-brightness pixel counter of the region, to which each pixel belongs, is incremented up. If the signal level is smaller than the threshold value 1 in the step S702, then determination in a step S704 is executed. In the step S704, the brightness detector unit 104 determines if the determination of the step S702 is conducted or not, for all of the regions, which are set up In the step S701, and if not, the process turns back to the step S702, thereby to conduct a series of processes. In a step S705, the brightness detector unit 104 compares the value of the high-brightness pixel counter to a threshold value 2, and if the value of the counter is larger than the threshold value 2, the process advances to a step S706. In the step S706, the brightness detector unit 104 determines that the point-like light source lies in the region, on which an attention is paid. If the value of the counter is smaller than the threshold value 2, in the step S705, the process advances to a step S707. In the step S707, the brightness detector unit 104 determines if the determination of the step S705 is conducted or not, for all of the regions, and if not, the process turns back to the step S705, thereby to conduct a series of processes. In case where the determination is completed for all of the regions, the process is completed. However, the values of the threshold value 1 and the threshold value 2 mentioned above may be stored in the EEPROM (the external device 107), etc., thereby to be used thereafter. Also, in the determination in the step S702, it does not matter, not compare the signal level of only the pixels, on which an attention is paid, to the threshold value 1, but to compare a value, which is calculated through a weighted averaging between pixels on the periphery thereof, to the threshold value 1. With doing this, it is possible to reduce ill influences due to injuries and/or noises. In the present embodiment, it is assumed that the processes shown in FIG. 7 are executed, by hardware, but of course, it does not matter to execute those by software. With such processes mentioned above, it is possible to determine presence/absence of the point-like light source (s) for each region, and thereby to specify the region, in which the point-like light source (s) lie(s).

(4) AF Control when Focal Point Estimation Value Insufficient for High-Accuracy AF Control is Calculated Explanation will be made of the AF control when the focal point estimation value insufficient for a high-accuracy AF control, by referring to FIGS. 8, 9 and 10.

Figure 8:
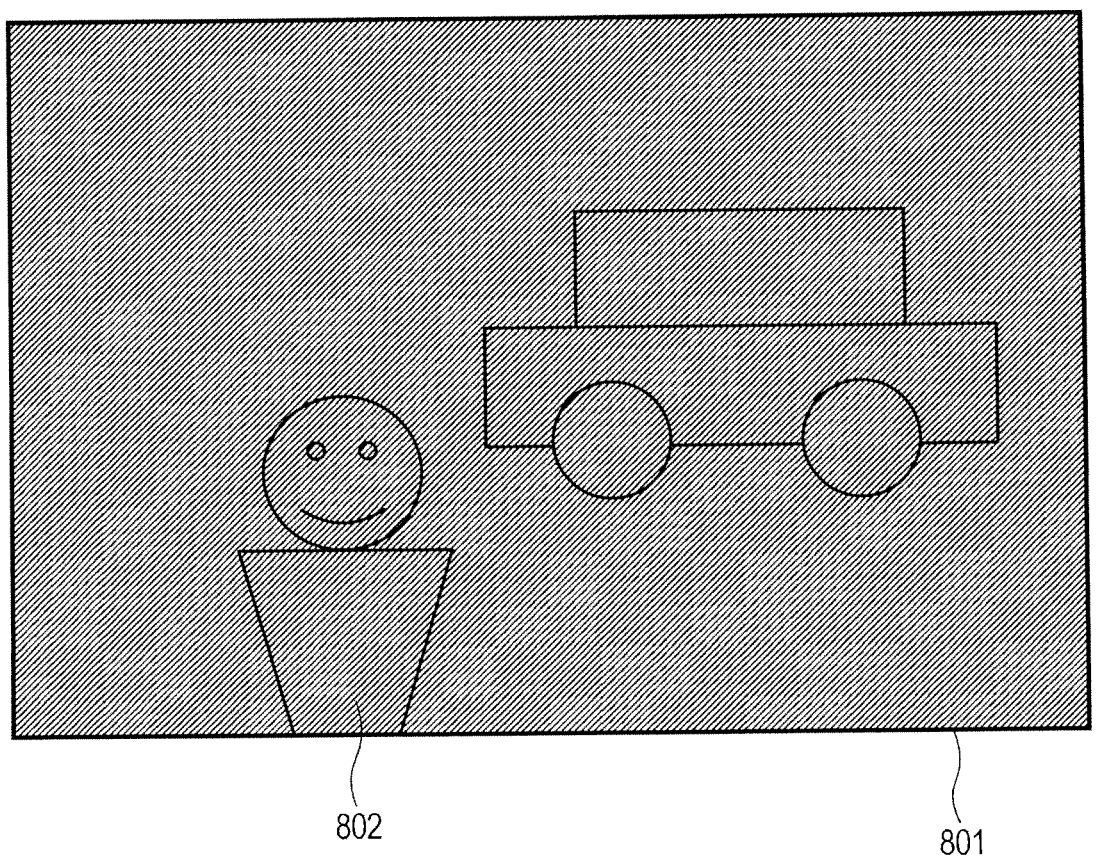
FIG. 8 is a view for explaining an example of the AF control, on a scene low in the contrast thereof, such as, a scene in the night, etc., etc., less in the number of the light sources.

FIG. 8 is a view for explaining an example of the AF control, on a scene low in the contrast thereof, such as, a scene in the night, etc., etc., less in the number of the light sources. A frame shown by 801 depicts, similar to the frame 402, the focal point estimation value calculation target region set up within the screen. A reference numeral 802 depicts a subject, and herein is assumed a scene low in the contrast thereof, such as, in the night, etc. On such the scene low in the contrast thereof as shown in FIG. 8, it is difficult to obtain the focal point estimation value, being sufficient for the high-accuracy AF control, and as a result thereof, the control of the focus lens comes to be unstable, sometimes.

Figure 9:
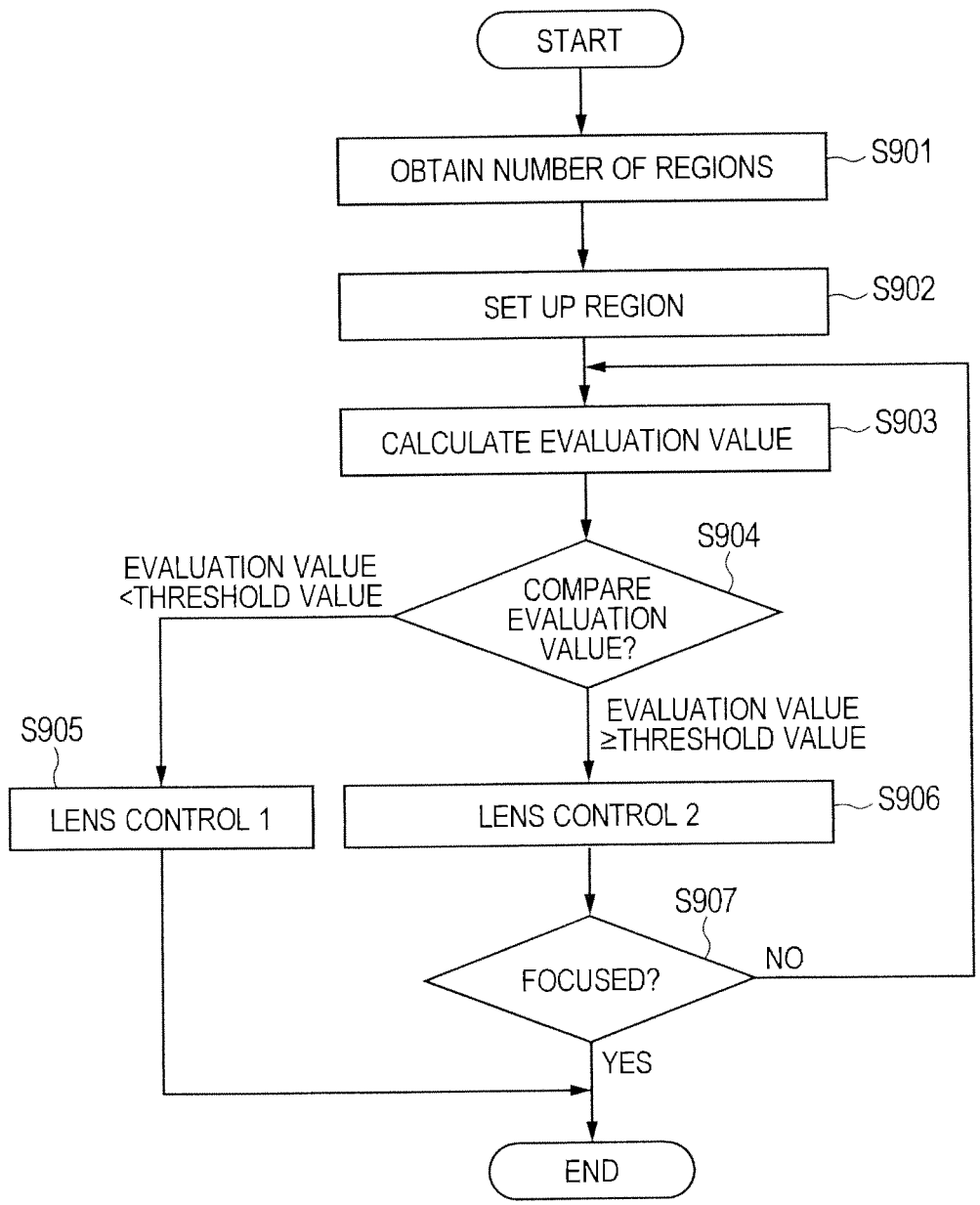
FIG. 9 is a view for explaining an example of a flow of processes of the AF control, on the scene low in the contrast thereof, such as, the scene in the night, less in the number of the light sources.

FIG. 9 is a view for explaining an example of a flow of processes of the AF control, on the scene low in the contrast thereof, such as, the scene in the night, etc., etc., being less in the number of the light sources. The processes shown in FIG. 9 are executed by the system controller unit 8. The present method is for calculating the focal point estimation value with using a signal within the focal point estimation value calculation target region, which is set up by the region setup unit 102, and thereby controlling the focus lens to move to the predetermined position when the calculated focal point estimation value is smaller than the threshold value. When the AF control is started, in a step S901, the system controller unit 108 obtains a position and a size for determining the focal point estimation value calculation target region. In this instance, the position and the size of the region may be stored in the EEPROM (the external device 107), etc., in the form of the values thereof, or it does not matter to use a constant number for those. In a step S902, the system controller unit 108 gives such a command that the region setup unit 102 sets up the focal point estimation value calculation target region. In a step S903, the system controller unit 108 gives a command to calculate the focal point evaluation value with using the signal of the focal point estimation value calculation target region. In a step S904, the focal point evaluation value calculated in the step S903 Is compared to a threshold value, and if the evaluation value is smaller than that, the process shifts into a step S905. In this instance, the threshold value may be may be stored in the EEPROM, etc., to be used thereafter. In the step S905, the focus lens is controlled to move to the predetermined position (d0), and the process is completed. In this instance, it does not matter to apply a value, which is set up in the EEPROM, etc., as the predetermined position. For example, in case when using a present video signal processing apparatus under such an environment that the subject rarely lies in very close range (at very short distance), it is preferable to make the value of "d0" adjustable depending on the environment, such as, the focus lens position, with which the focusing can be obtained at a position separating by several meters from the apparatus, is set up as "d0", etc. Processes in steps S906 and S907 are similar to those of the steps S607 and S608 mentioned above, and therefore, the explanation thereof will be omitted, herein. According to the present embodiment, controlling of the focus lens to move to the predetermined position, when there cannot be obtained the focal point estimation value sufficient for the high-accuracy AF control, such as, in case where the contrast of the subject is low, etc., enables to prevent the AF control from be coming unstable . With such processes as mentioned above, it is possible to achieve the AF control, being stable even on the scene, which is low in the contrast thereof.

Figure 10:
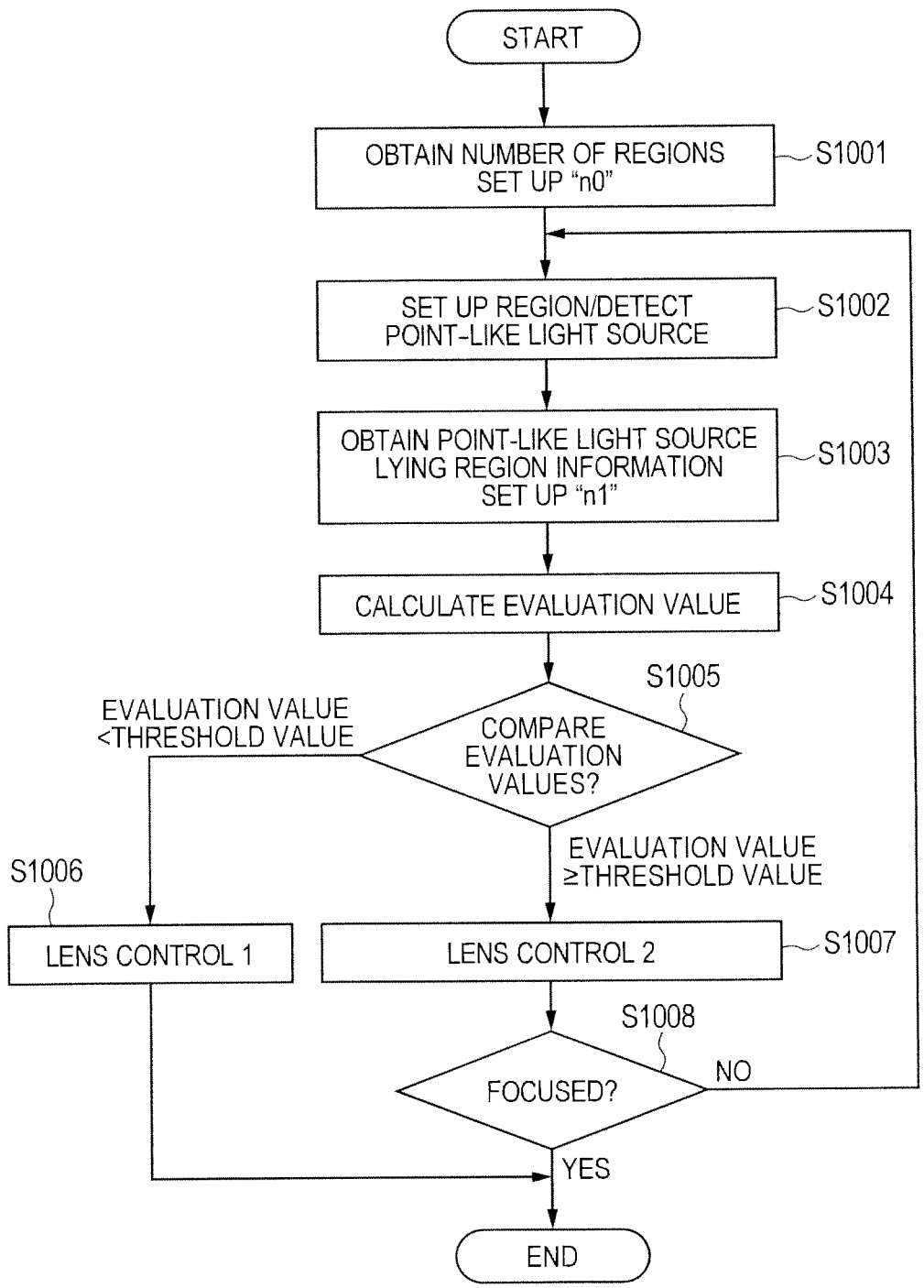
FIG. 10 is a view for explaining an example of a flow of processed of a brightness supporting AF control, on the scene low in the contrast thereof, such as, the scene in the night, less in the number of the light sources.

FIG. 10 is a view for explaining an example of a flow of processed of a brightness supporting AF control, on the scene low in the contrast thereof, such as, the scene in the night, less in the number of the light sources. Processes shown in FIG. 10 are executed by the system controller 108. The present method is for the divided region setup unit 103 to set up an arbitrary number of regions within the focal point estimation value calculation target region set up by the region setup unit 102, for the brightness detector unit 104 to determine presence/absence of the point-like light source(s) within each region, and for the estimation calculator unit 105 to calculate the focal point estimation value, by excluding the region (s) determined to have the point-like light source (s) therein from the focal point estimation value calculation target region, and thereby to control the focus lens to the predetermined position when the foal position estimation value calculated is smaller than the threshold value. In steps from S1001 to S1003 are conducted the processes similar to those in the steps from S601 to S603. In a step S1004, the system controller unit 108 sets up the point-like light source existing region information, which is obtained in the step S1003, into the estimation calculator unit 105, and gives a command to calculate a brightness supporting focal point estimation value by excluding the region (s), in which the point-like light source g) lie(s), from the focal point estimation value calculation target region. In a step S1005, comparison is made between the brightness supporting focal point estimation value calculated in the step S1004 and the threshold value, and when the evaluation value is smaller than that, the process shifts into a step S1006. In this instance, the threshold value may be stored in the EEPROM, etc., to be used thereafter. In the step S1006, the focus lens is controlled to move to the predetermined posit ion (d0), and the process is completed. In this instance, as the threshold value, it does not matter to apply a value, which is set up in advance within the EEPROM, etc. For example, in case when using a present video signal processing apparatus under such an environment that the subject rarely lies in very close range (at very short distance), it is preferable to mate the value of "d0" adjustable depending on the environment, such as, the focus lens position, with which the focusing can be obtained at a position separating by several meters from the apparatus, is set up as "d0", etc. In case where the evaluation value is determined to be greater that the threshold value in the step S1005, the process shifts into a step S1007. Process in the step S1007, as well as, that in a step S1008, is similar to that in the steps S607 and S608, and therefore explanation thereof will be omitted herein. According to the present embodiment, it is possible to prevent the brightness supporting AF control from be coming unstable by controlling the focus lens to move to the predetermined position, where there cannot be obtained the focal point estimation value sufficient for the high-accuracy brightness supporting AF control, such as, when the contrast of the subject is low. With such processes mentioned above, it is possible to achieve the brightness supporting AF control, being stable on the scene, in which the contrast thereof is low.

(5) Timing to Re-start Lens Control After Focus Lend Move Control

Explanation will be given on a process for re-starting the focus lens control at a predetermined timing after controlling the focus lens to move to the predetermined position in the steps S605, S905 and S1006, by referring to FIGS. 11, 12 and 13. Processes shown in FIGS. 11 and 12 are executed, repetitively, at a predetermined timing, up to when the focus lens control is re-started, after controlling the focus lens to move to the predetermined position.

Figure 11:
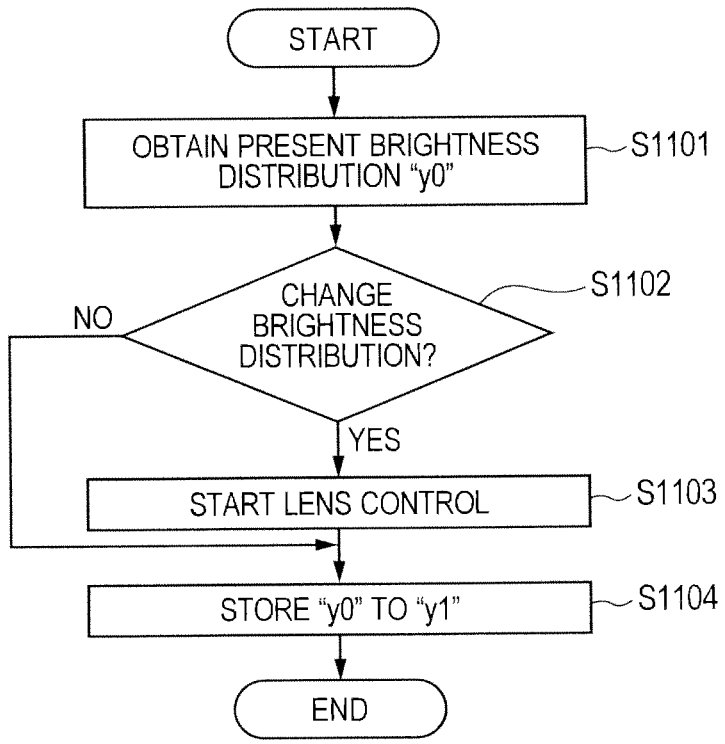
FIG. 11 is a view for showing an example of a flow of processes, for re-starting a lens control when a change of brightness distribution is detected, after controlling a focus lens to move to a predetermined position.

FIG. 11 is a view for showing an example of a flow of processes, for re-starting a lens control when a change of brightness distribution is detected, after controlling the focus lens to move to the predetermined position. Processes shown in FIG. 11 are executed by the system controller unit 108. In a step S1101, the system controller unit 108 obtains brightness distribution information "y0" of a video signal from a brightness distribution detector unit, which is owned by the video processor unit 106. The brightness distribution information means, for example, an averaged brightness of the pixels within the focal point estimation value calculation target region. In a step S1102, comparison is made between the brightness distribution information "y0" at present and the brightness distribution information "y1" at previous time, and if there is a difference between "y0" and "y1" greater than a predetermined value, the process shifts into a step S1103, determining that the brightness distribution is changed. In the step S1103, the system controller unit 108 re-starts the control of the focus lens. In a step S1104, "y0" is stored to "y1". Where there is no difference greater than the predetermined value in the step S1102, the process shifts into the step S1104. In the present embodiment, even after the focus lens is controlled to move to the predetermined position for the purpose of preventing the focus lens control from becoming unstable, it is possible to detect timing for re-starting the focus lens control in case where the subject is changed, etc., and thereby to re-start the focus lens control at appropriate timing. With this, it is possible to prevent the focus lens from falling into the condition that focus lens position is fixed always. With such processes as mentioned above, it is possible to prevent the control of the focus lens from becoming unstable, and also to achieve an appropriate AF control.

Figure 12:
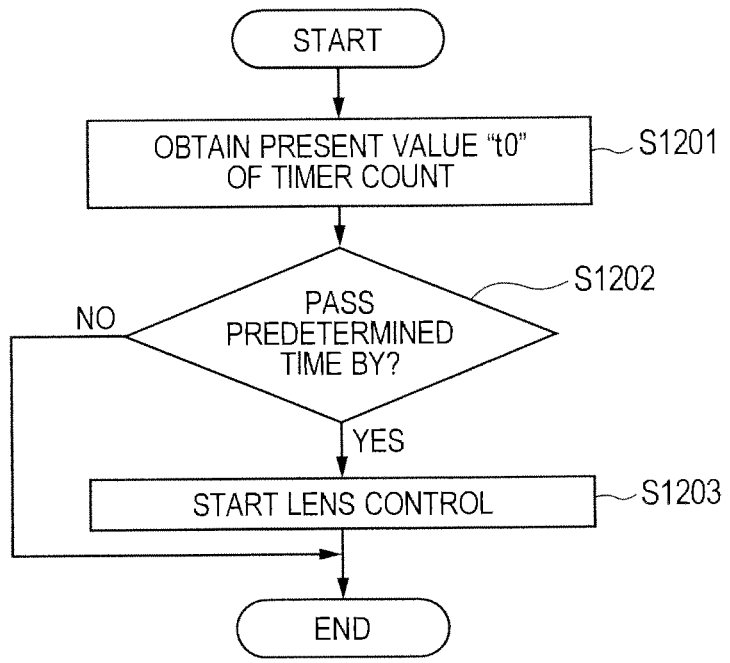
FIG. 12 is a view for showing an example of a flow of processes for re-starting the lens control when a predetermined time passes by, after controlling the focus lens to move no the predetermined position.

FIG. 12 is a view for showing an example of a flow of processes for re-starting the lens control when a predetermined time passes by, after controlling the focus lens to move to the predetermined position. The processes shown in FIG. 12 are conducted by the system controller unit 108. It is assumed that the focus lens is controlled to move to the predetermined position, and at the same time, that a timer count is started, in the steps S605, S905 and S1006. In a step S1201 is obtained a value "t0" of the timer count at present. If "t0" is larger than a predetermined value, in a step S1202, the process shifts into a step S1203. In the step S1203, the system controller unit 108 starts the control, again, on the focus lens. If "t0" is less than the predetermined value, in a step S1202, the process is completed. According to the present embodiment, the focus lens control is re-started after elapsing the predetermined time-period, even after the focus lens is controlled to move to the predetermined position for the purpose of preventing the focus lens control from becoming unstable, and thereby preventing the focus lens from being always fixed at the position. With such processes as mentioned above, it is possible to prevent the control of the focus lens from becoming unstable, and also to achieve an appropriate AF control.

Figure 13:
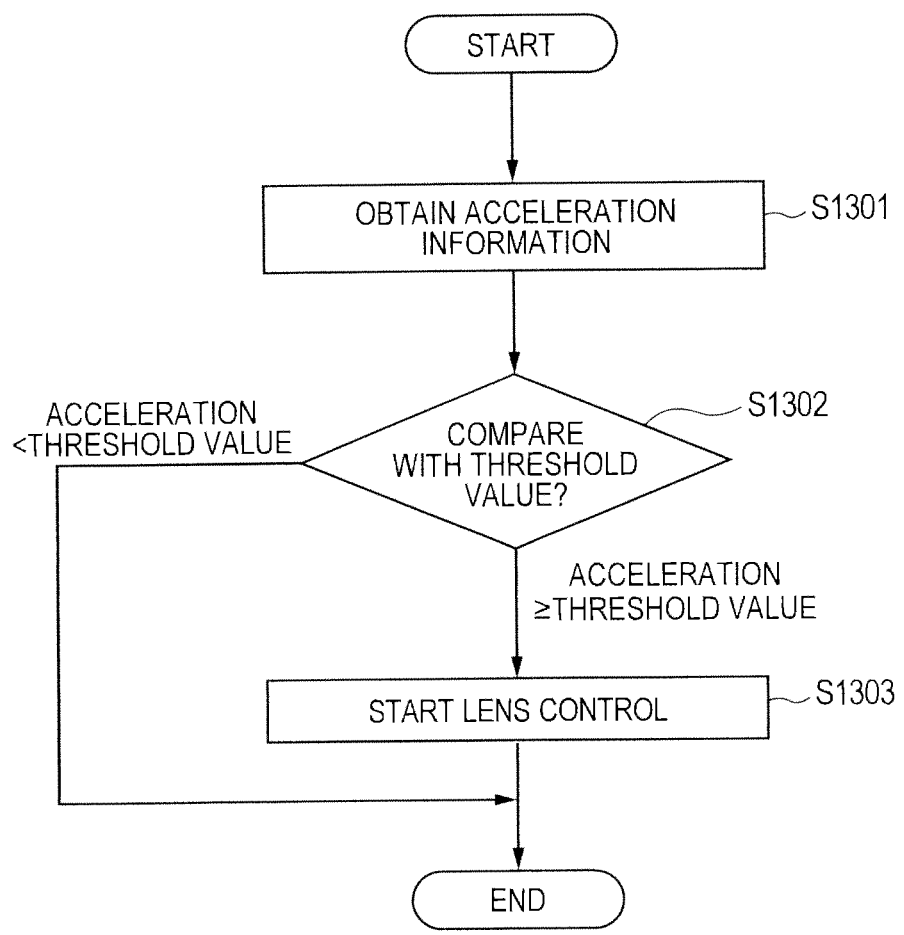
FIG. 13 is a view for showing an example o f a flow of processes for re-starting the lens control when a predetermined acceleration is detected, after controlling the focus lens to move to the predetermined position.

FIG. 13 is a view for showing an example of a flow of processes for re-starting the lens control when an acceleration detected by an acceleration sensor, which is provided as the external device 107, exceed a predetermined value, after controlling the focus lens to move to the p predetermined position. The processes shown in FIG. 13 are conducted by the system controller unit 108. In a step S1301, the system controller unit 108 obtains acceleration Information from the acceleration sensor. In a step S1302 is made comparison between the acceleration information obtained and a threshold value, and if the acceleration information obtained is smaller than the threshold value, the process is completed. If the acceleration information obtained is greater than the threshold value, the process shifts into a step S1303. In the step S1303, the system controller unit 103 re-starts the control on the focus lens. According to the present embodiment, the focus lens control is re-started when the acceleration sensor detects a predetermined acceleration, even after the focus lens is controlled to move to the predetermined position for the purpose of preventing the focus lens control from becoming unstable, and thereby preventing the focus lens from being always fixed at the position. With such processes as mentioned above, it is possible to prevent the control of the focus lens from becoming unstable, and also to achieve an appropriate AF control.

Figure 14:
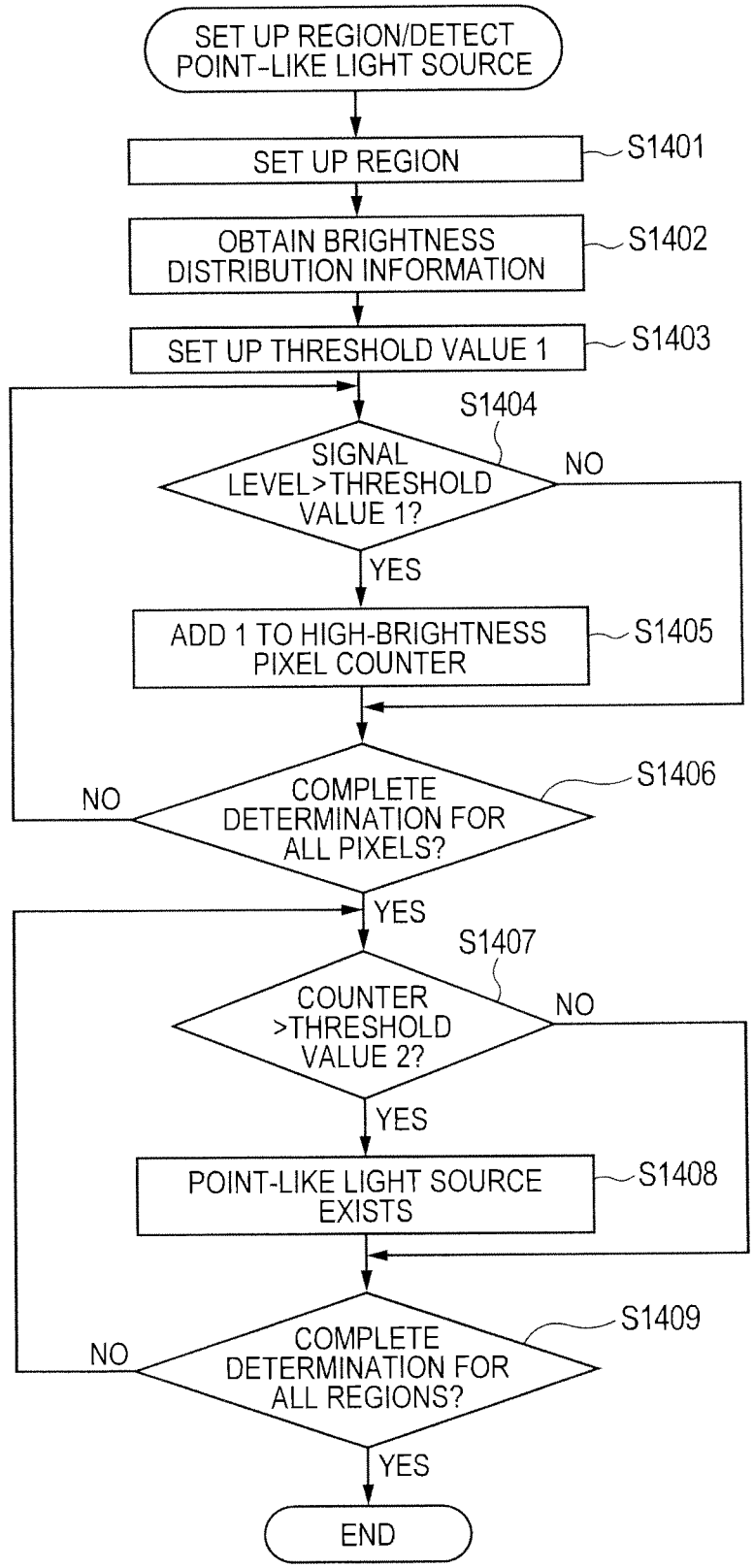
FIG. 14 is a view for showing an example of a flow of processes for controlling a first threshold value (a threshold value 1) to be applied when detecting a point-like light source, depending on the brightness distribution, in a brightness detector unit 104 (FIG. 1).

(6) Threshold Value Control depending on Brightness Distribution of Video Signal FIG. 14 is a view for showing an example of a flow of processes for controlling a first threshold value (a threshold value 1) to be applied when detecting a point-like light source, depending on the brightness distribution. In the brightness detector unit 104. The processes shown in FIG. 14 are conducted by the system controller unit 108. A process in a step S1401 is the same to that in the step S101. In a step S1402, the system controller unit 108 obtains brightness distribution information of the video signal, for example, from the brightness distribution detector unit owned by the video processor unit 106. The brightness distribution information means, for example, an averaged brightness of the pixels within the focal point estimation value calculation target region. In a step S1403 is calculated the threshold value 1 from the brightness distribution information, which is obtained in the step S1402. In this instance, a correspondence table between the brightness distribution information and the threshold value 1 may be stored within the EEPROM, etc., so as to determine the threshold value 1 with using that, or in the place thereof, there may be stored a function equation for calculating the threshold value 1 from the brightness distribution information, so as to be used. In case of using the function equation, not an approximate value, but a correct value can be used, and comparing to the method of storing in the form of the table, it is possible to reduce a volume of data to be stored. Processes after the step S1404 are same to that in the step S702. According to the present embodiment, the threshold value for detecting the point-like light source is exchanged, dynamically, between a case where the point-like light source(s) lie(s) in the scene being dark as a whole and a case where the point-like light source (s) lie (s) in the scene of normal brightness, and therefore it is possible to prevent a subject not the point-like light source from being detected to be the point-like light source, erroneously, and/or to prevent a weal point-like light source lying in the dark scene from not being detected. With such processes as mentioned above, it is possible to achieve an appropriate brightness supporting AF control, always.

However, the present invention should not be restricted only to the embodiment(s) mentioned above, but may include various variations thereof. For example, it may be so structured that each of the threshold values and the predetermined position to be controlled to move may be exchanged depending on a photographing mode selected by a user.

Also, for example, the embodiment(s) mentioned above are explained in details thereof, for the purpose of easy understanding thereof, and therefore, the present invention should not be limited to that having all of the constituent elements thereof. Also, a part of the constituent elements in a certain embodiment can be substituted with the constituent element of the other embodiment (s), or the constituent element of other embodiment(s) may be added to a part of the constituent element of a certain embodiment. And also, with respect to a part of the constituent element, other constituent element can be added to, removed from or replaced with.

Also, with each of constituent elements mentioned above, a part or all thereof may be constructed with hardware, or may be constructed so that program is executed by a processor. Also, control lines and/or information lines are shown, which can be considered to be necessary for the explanation, but all of the control lines and the information lines, which are necessary for a product, are not shown, necessarily. Actually, it can be considered that almost of all constituent elements are connected, mutually, with each other.

What is claimed is:

1. A video signal processing apparatus, comprising:
an image pickup unit having a focus lens;
an evaluation value calculator unit, which is configured to specify a region, in which brightness higher than a predetermined value lies, from within a region to be a target, for which a focal point estimation value is calculated to be used for moving said focus lens to a focal point, and to calculate the focal point estimation value by excluding the region, in which said brightness higher than the predetermined value lies, from a focal point estimation value calculation target; and
a system controller unit, which is configured to control to be focused upon basis of the focal point estimation value calculated by said evaluation value calculator unit,
wherein said system controller unit controls said focus lens to move to a predetermined position, when a ratio of the region, in which said brightness higher than the predetermined value lies, to the region be the target, for which the focal point estimation value is calculated, is greater than a threshold value, and completes the processes of the auto focus (AF) control without calculating a focal point estimation value of said predetermined position by said evaluation value calculator unit.

2. The video signal processing apparatus, as described in the claim 1, wherein
said system controller unit starts a lens control, again, at a predetermined timing, after controlling the focus lens to move to the predetermined position.

3. The video signal processing apparatus, as described in the claim 2, wherein
the predetermined timing is when brightness distribution of a video signal is changed by an amount greater than a predetermined one.

4. The video signal processing apparatus, as described in the claim 2, wherein the predetermined timing is when a predetermined time passes by.

5. The video signal processing apparatus, as described in the claim 2, further comprising:
an acceleration detector unit, which is configured to detect an acceleration,
wherein the predetermined timing is when information obtained from said acceleration detector unit is changed by an amount greater than a predetermined one.

6. The video signal processing apparatus, as described in the claim 1, wherein
said system controller unit controls said focus lens to move to the position, which is determined in advance, when a total area of the region, in which said brightness higher than the predetermined value lies, comes to be larger than a predetermined area.

7. The video signal processing apparatus, as described in the claim 1, further comprising:
a divided region setup unit, which is configured to divide the region to be the target, for which the focal point estimation value is calculated, to set up,
wherein in said evaluation value calculator unit, the region, in which said brightness higher than the predetermined value lies, is set up by a unit of divided region, which is determined in said divided region setup unit.

8. The video signal processing apparatus, as described in the claim 1, wherein
the predetermined position of said focus lens, which is controlled to move by said system controller unit, is exchanged depending on a setup mode.

9. The video signal processing apparatus, as described in the claim 7, wherein
said evaluation value calculator unit determines, in each of regions divided by said divided region setup unit, said region to be a high-brightness region, when a number of pixels having a brightness value exceeding a first threshold value exceeds a second threshold value, and
said system controller unit controls said first threshold value depending on brightness distribution of the video signal.

* * * * *